(12) United States Patent
Knapper et al.

(10) Patent No.: US 8,283,007 B2
(45) Date of Patent: Oct. 9, 2012

(54) BLOW MOLDED RECEPTACLE AND SYSTEM FOR MAKING SAME

(75) Inventors: Alan W. Knapper, McCausland, IA (US); Daniel E. Koranda, Clinton, IA (US); Michael L. Grinnall, Clinton, IA (US)

(73) Assignee: Custom-Pak, Inc., Clinton, IA (US)

( * ) Notice: Subject to any disclaimer, the term of this patent is extended or adjusted under 35 U.S.C. 154(b) by 1296 days.

(21) Appl. No.: 11/245,603

(22) Filed: Oct. 7, 2005

(65) Prior Publication Data
US 2007/0082153 A1    Apr. 12, 2007

(51) Int. Cl.
*B32B 27/00* (2006.01)
*B65D 1/24* (2006.01)

(52) U.S. Cl. ........................... 428/35.7; 220/675
(58) Field of Classification Search .............. 428/34.1, 428/35.7; 220/675; 264/155
See application file for complete search history.

(56) References Cited

U.S. PATENT DOCUMENTS

| | | | |
|---|---|---|---|
| 3,902,628 A * | 9/1975 | Schurman | 220/835 |
| 5,429,240 A * | 7/1995 | Biebel et al. | 206/455 |
| 6,083,579 A * | 7/2000 | Schurman | 428/34.1 |
| 6,348,173 B1 | 2/2002 | Anderson | 264/318 |
| 2003/0104098 A1 | 6/2003 | Schrader | 425/522 |
| 2006/0006587 A1 * | 1/2006 | Schrader | 264/531 |

* cited by examiner

*Primary Examiner* — Erik Kashnikow
(74) *Attorney, Agent, or Firm* — St. Onge Steward Johnston & Reens LLC (57) ABSTRACT

A system for making blow molded receptacles is disclosed generally comprising two mold portions that, when positioned adjacent each other, at least partially enclose a cavity defined by a molding surface, against which the walls of a blow molded receptacle are blown. One of the portions is a mold core, which has a base surface and a raised portion extending out from the base surface into the cavity. The raised portion has an outer surface and a side surface, which results in a corresponding, inner sidewall on the blow-molded receptacle. The raised portion houses a punch partly disposed in an opening in the side surface for punching a hole in the sidewall. In some embodiments, the side surface is substantially perpendicular to the seal between the two mold portions, and an actuator displaces the punch in a direction substantially parallel to the seam.

12 Claims, 11 Drawing Sheets

BLOW MOLDED RECEPTACLE AND SYSTEM FOR MAKING SAME

FIELD OF THE INVENTION

The present invention relates to a system for producing holes in double wall, blow molded articles. More specifically, the invention relates to a system of creating a double wall receptacle by forming, and punching a hole in, an inner sidewall that is around the mold core, which houses the punch.

BACKGROUND OF THE INVENTION

The use of blow-molding as a method for manufacturing various sorts of articles is generally well known. Typically, this process involves the use of a mold consisting of two separate halves or portions having cavities of particularly desired shapes and sizes. Usually, one extrudes a large-diameter, sealed tube of molten material (commonly referred to as a "parison"), places the tube between the mold halves, and closes the mold around the tube. Fluid pressure is then introduced into the tube, forcing the molten tube against the walls of the cavities, conforming the tube to the shape thereof. The pressure is maintained until the molten material cools and solidifies. The pressure is then released, the mold halves are pulled apart, and the hardened article is ejected therefrom.

Many types of articles are manufactured in this manner in order to produce a double wall body. By producing an article in this manner, one is able to easily create an article that has two, hard plastic walls with a buffering space between them, thereby resulting in a body with a multitude of desirable physical characteristics, such as strength, rigidity, scuff resistance, and impact absorption, but that is also relatively inexpensive to manufacture. Because blow molding is a fairly simple way of producing a double wall article which is both inexpensive and lightweight, yet also strong and durable, it is not uncommon to use this method for manufacturing various types of housings and cases for machinery, tools, and industrial applications.

When manufacturing double wall articles of this nature, the mold in which the parison is placed often includes a first half, which has a recessed surface that serves as part of the mold cavity surface against which the wall of the blow molded article is blown, and a "core" half, which generally contains at least one projecting (or "male") section, over which the molten parison drapes as the mold is closed. When fluid pressure is subsequently introduced into the parison, molten material is pressed against the projecting mold section, conforming the tube to the shape thereof, where it cools, shrinks, and solidifies. An example of such a system is disclosed in U.S. Pat. No. 6,348,173, which is assigned to the assignee of the present application. Accordingly, with this type of mold, the projecting section of the mold core can be used to cause a large portion of the article to a thin, double wall structure, while the remainder to the article—such as the perimeter surrounding the thin portion, may comprises a thicker double wall structure.

One way in which these types of articles can be improved, however, is by utilizing the ability to create space between the walls to produce articles that can hold items, such as machine manuals or accessories. It is known that one way of doing this is to create a double wall article using two mold halves that have recessed mold surfaces that are fairly well spaced apart when the mold is in a closed position, such that a wide cavity is created therebetween, where the surface of a punch comprises part of one of the mold surfaces. The punch, when in an unactivated position, forms a portion of mold surface, against which the walls of the blow molded case are blown. Then, at a predetermined interval, before the walls of the case are fully hardened, the punch is moved to an activated position, creating a hole in the wall of the case.

Examples of such a system are disclosed in U.S. patent application Ser. Nos. 10/958,824 and 11/105,721, each of which is assigned to the assignee of the present application, which deal with the formation of double wall, blow molded cases. During the blow molding process, the parison is blown against these mold surfaces (one of which includes a portion of the punch) to form the walls of the blow molded article. Early in the molding cycle, while the walls of the article are still somewhat molten, the punch is activated, at which time the punch's cutting surface cuts through the wall and enters the mold cavity. The punch is then withdrawn, and subsequently, the mold is opened and the blow molded article removed.

In these systems, the punch generally moves in the direction in which the mold portions are moved when the mold is closed. This allows the punching forces to be backed by the press portion of the mold and allows for relatively uncomplicated part removal, and allows for minor angles and steps incorporated in the punch cylinders. Accordingly, the resultant holes are parallel to the parting line and serve to remove a portion of one the walls that forms the rigid, double wall structure. While these devices are very advantageous in applications such as cases and other types of closeable containers, they may not be practical in other applications.

This is especially true, for example, in applications where it is not desired that another, corresponding part, such as a lid, be required to cover the hole. Unlike in the instance of portable cases—which include a cover to retain the items being carried in the case when carried in a vertical orientation, and which can be lain horizontally when the case is opened to access the items—in other applications, it may be desired to mount a receptacle in a vertical position. In these situations, a hole in one of the larger surfaces of the receptacle would be virtually useless, as any items place therein would fall out as soon as they weren't restrained. In these types of applications, the area that is made available by creating a hole in a wall of the article should be able to retain the items independently of any restraining device.

This type of arrangement may be desired in a wide variety of situations. For example, it may be desired to vertically orient a receptacle by mounting it to a machine or a vehicle, such as, for example, a tractor or forklift, in order to house documents or books that may need to be accessed by the user, such as instruction/operation manuals, maintenance records, or floor layouts. Alternatively, it may be desired to mount such a receptacle to certain machinery in order to hold other types of items, such as, for example, to an aerial lift in order to house safety harness equipment. Additionally, there may also be applications in which it is desirable to retain the integrity of the double wall structure along substantially the entire length of the receptacle.

What is desired, therefore, is a blow molded, double wall receptacle with an opening to the cavity between the walls that is somewhat horizontal when the receptacle is oriented in a vertical position, as well as a system for punching such a hole. What is also desired is a blow molded, double wall receptacle that essentially retains a double wall structure along its length.

Additionally, punching a hole in a somewhat horizontal wall as described above presents several challenges. For example, shrinkage of the hardened plastic onto the sidewalls of a mold core can sometimes restrict the punching action and prohibit part removal. Additionally, the force supplied by the punch cylinder will sometimes be insufficient to cut through the wall, for several reasons. First, because the process involves a sidewall, and thus, the punching action must occur substantially perpendicular to the open-close direction of the mold, the cylinder will not be supported by the press portion of the mold, and therefore, the cylinder will have to be even larger to supply the necessary power and speed. At the same time, if the cylinder is located in the mold core, the size of the cylinder is necessarily limited due to space constraints. Similarly, the positioning of the punch controlled by a cylinder in-line with the punch is limited due to the diameter of the cylinder, and thus, the punch could not be located at the top of the mold core in order accommodate for the width of the cylinder.

What is further desired, therefore, is a system for creating a blow molded, double wall receptacle of the aforementioned type that does not limit the size of the punch cylinder. What is also desired is a system for creating a blow molded, double wall receptacle of the aforementioned type that does not limit the positioning of the punch.

SUMMARY OF THE INVENTION

Accordingly, it is an object of the present invention to provide a blow molded, double wall receptacle with an opening that is somewhat horizontal when the receptacle is oriented vertically.

It is a further object of the present invention to provide a system for creating a blow molded, double wall receptacle that essentially maintains its double wall structure along its length.

It is yet another object of the present invention to a blow molded, double wall receptacle of the aforementioned type that does not limit the size of the punch cylinder.

It is still another object of the present invention to a blow molded, double wall receptacle of the aforementioned type that does not limit the positioning of the punch.

In order to overcome the deficiencies of the prior art and to achieve at least some of the objects and advantages listed, the invention comprises an apparatus for creating a blow-molded receptacle, including a first mold portion, and a mold core having a molding surface against which a wall of the blow molded receptacle is blown during blow molding, the mold core being positionable adjacent the first mold portion to at least partially enclose a cavity, wherein the mold core comprises a base surface, a raised portion extending transversely from the base surface and into the cavity, the raised portion having an outer surface and a side surface, the side surface having an opening therein, and a punch located in the opening of the side surface such that, when the punch is in a first position, the molding surface includes at least part of the punch and, when the punch is in a second position, at least part of the punch is extended past the wall of the blow molded article and into the cavity such that a hole is created in the wall of the blow molded case.

In some of these embodiments, the apparatus includes a fluid cylinder mounted the mold core, a linear bearing mounted to the mold core, a shaft connected to the cylinder and disposed in the bearing such that actuating the cylinder displaces the shaft longitudinally through the bearing, and a mounting bar by which the punch is mounted to the shaft such that, when the shaft is longitudinally displaced, the punch is moved in a direction parallel to the shaft.

In another embodiment, the invention comprises an apparatus for creating a blow-molded receptacle, including a mold comprising first and second mold portions that, when located adjacent each other, at least partially enclose a cavity and at least partly define a molding surface against which a wall of the blow molded receptacle is blown during blow molding, wherein the second mold portion comprises a raised portion extending into the cavity, the raised portion having an outer surface and a side surface, the side surface having an opening therein, and a punch located in the opening of the side surface such that, when the punch is in a first position, the molding surface includes at least part of the punch and, when the punch is in a second position, at least part of the punch is extended past the wall of the blow molded article and into the cavity such that a hole is created in the wall of the blow molded case.

In yet another embodiment, the invention comprises a method for creating a blow-molded receptacle, including providing a mold comprising a first mold portion and a mold core, the mold core having a raised portion with an outer surface and a side surface, positioning the first mold portion and the mold core adjacent each other to create a cavity having a molding surface against which a wall of the blow molded article is blown, blowing the wall of the blow molded receptacle against the molding surface, thereby creating a double wall article with a sidewall corresponding to the side surface of the raised portion of the mold core, and creating a hole in the sidewall.

In still another embodiment, the invention comprises a blow molded receptacle, including a double wall, blow molded body, the body having first and second sides at least partially enclosing a cavity therebetween, wherein the second side includes an unraised portion and a raised portion extending transversely from the unraised portion, the raised portion having an outer wall and a sidewall, such that the cavity is wider between the outer wall and the first side than between the unraised portion and the first side, and wherein the sidewall has a hole therethrough. In some embodiments, the invention includes a lid portion integrally formed with the body.

DETAILED DESCRIPTION OF THE DRAWINGS

Figure 1A:
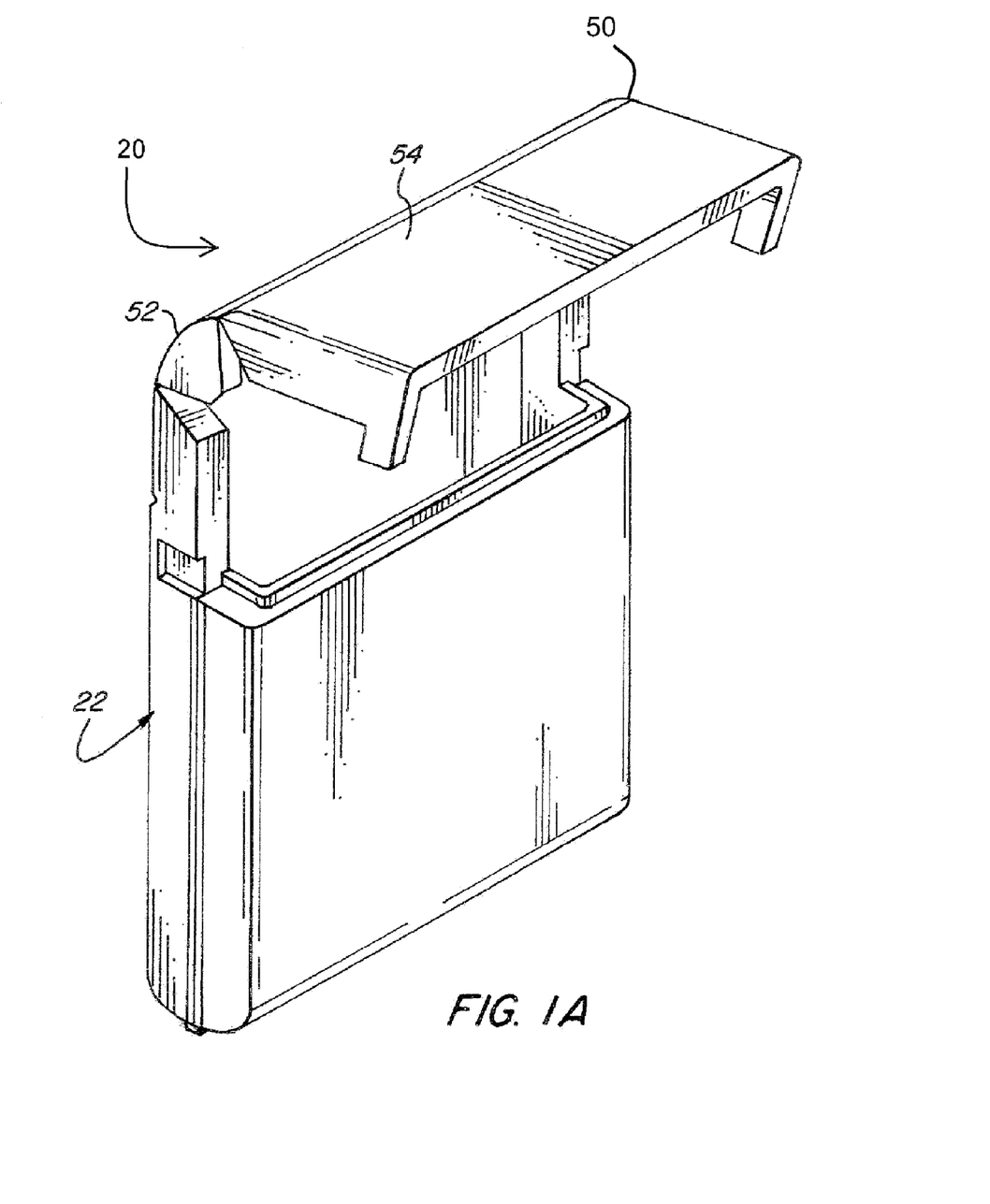
FIG. 1A is an isometric view of a receptacle made in accordance with the invention.
Figure 1B:
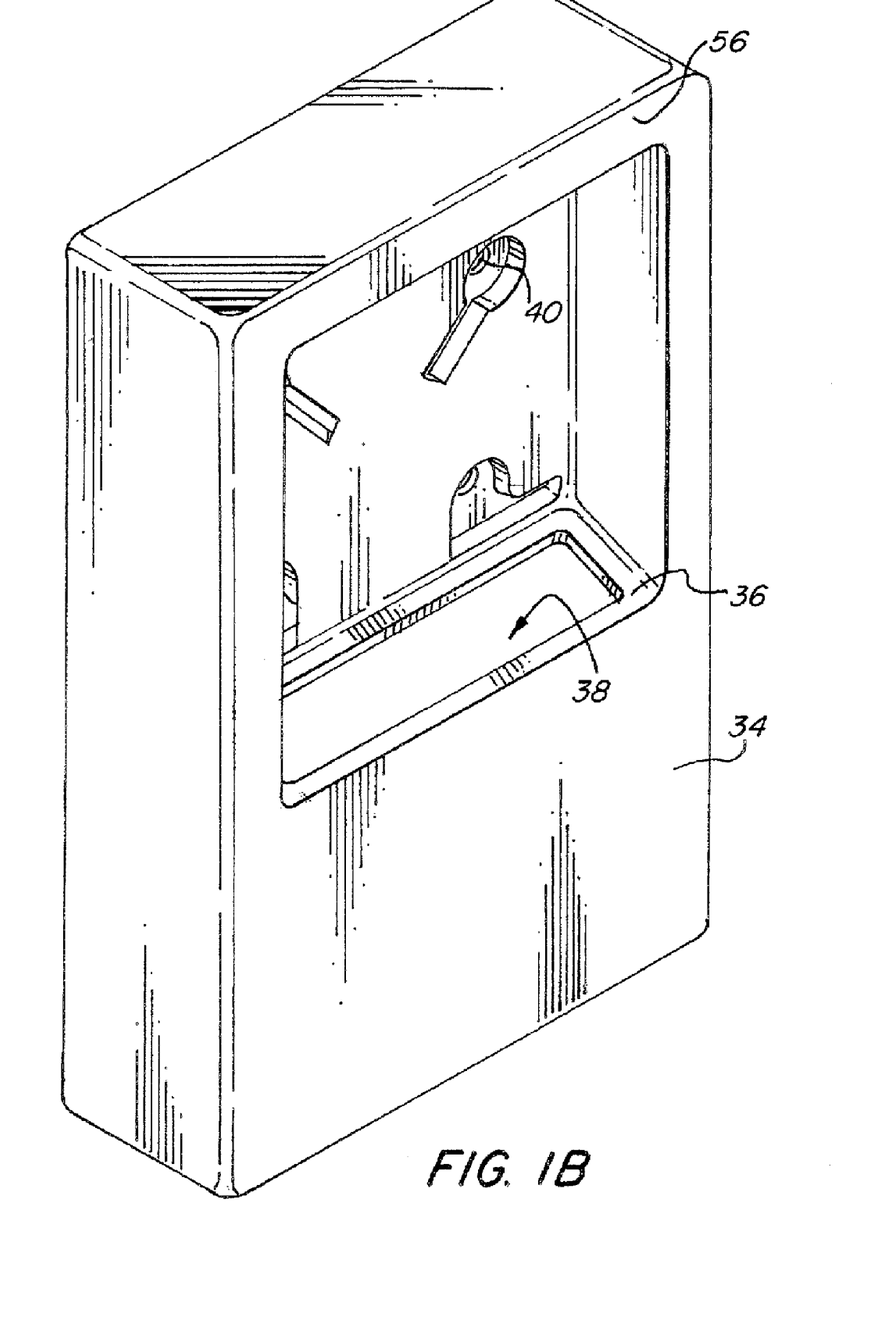
FIG. 1B is an isometric view of the receptacle of FIG. 1A with a blow molded end wall.
Figure 1C:
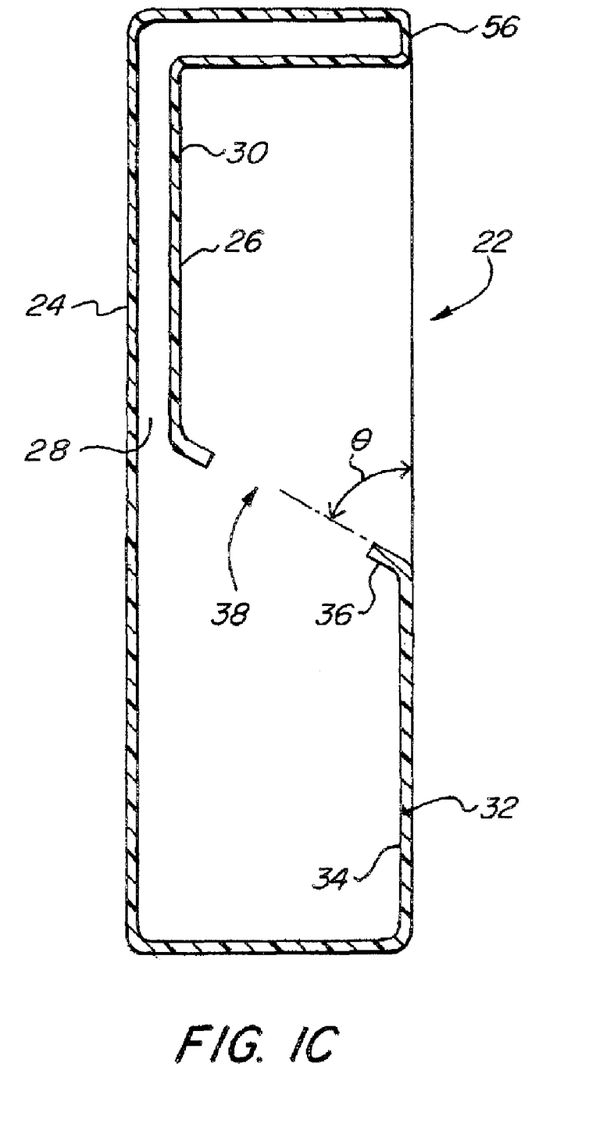
FIG. 1C is a cross-sectional view of the receptacle of FIG. 1B.

Referring first to FIG. 1A-C, a typical example of a receptacle made in accordance with the invention is illustrated in FIG. 1. As used in the description, the terms "top," "bottom," "above," "below," "over," "under," "above," "beneath," "on top," "underneath," "up," "down," "upper," "lower," "front," "rear," "back," "forward" and "backward" refer to the objects referenced when in the orientation illustrated in the drawings, which orientation is not necessary for achieving the objects of the invention.

The receptacle 20 includes a blow-molded, double wall body 22 having a first side 24 and a second side 26, which at least partially enclose a cavity 28 therebetween. The second side 26 includes an unraised portion 30 and a raised portion 32 extending transversely from the unraised portion 30. The raised portion 32 includes an outer wall 34 and a sidewall 36. The sidewall 36 is inclined at an angle (θ) of at least forty five degrees relative the outer wall 34, and, in certain advantageous embodiments, is substantially perpendicular thereto. The sidewall 36 has a hole 38 therethrough, thereby exposing part of the cavity 28 such that items can be inserted in this space.

Figure 1D:
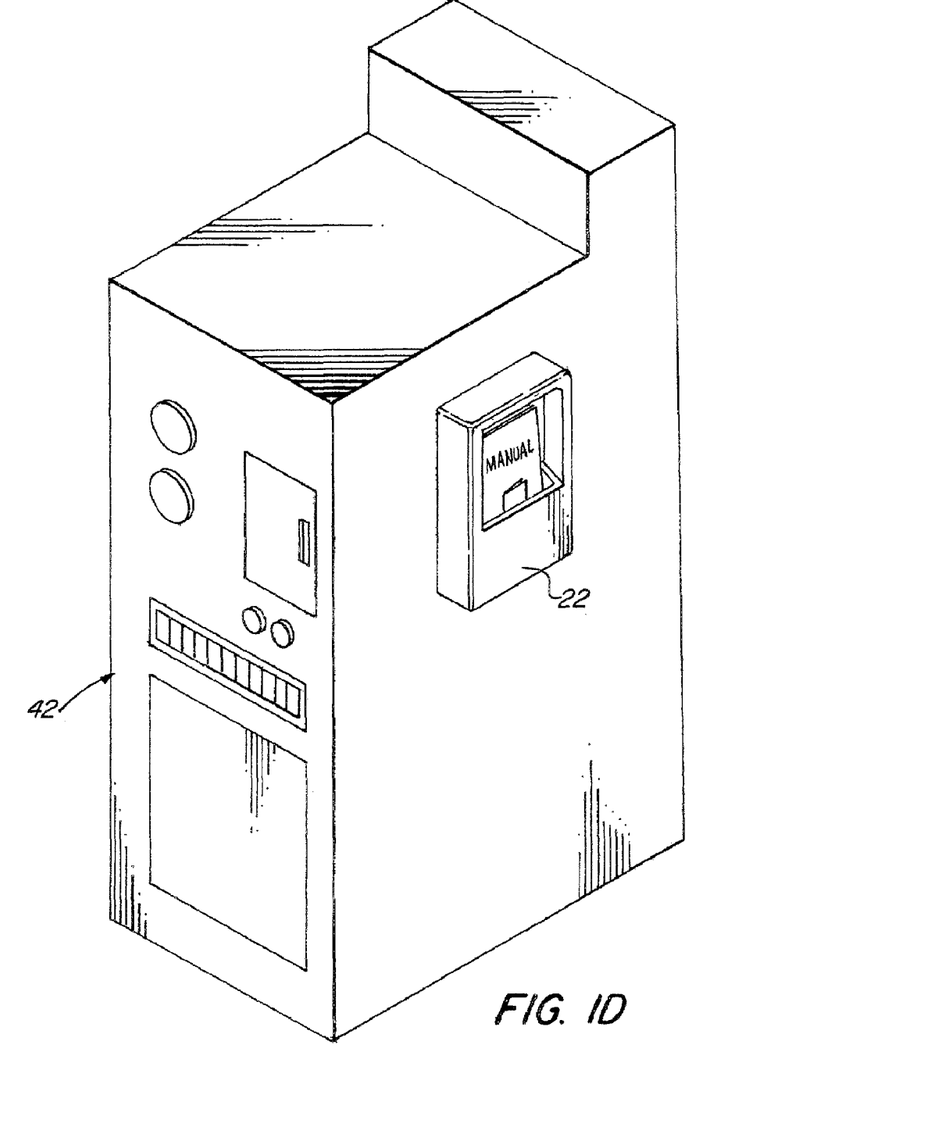
FIG. 1D is an isometric view of the receptacle of FIG. 1A mounted to an object.

In certain advantageous embodiments, the first side 24 has a one or more apertures 40 adapted to receive fasteners for mounting the body 22 to an object 42, such as a machine or vehicle, as illustrated In FIG. 1D.

In certain embodiments, a lid portion 50 is connected to the body 22 in order to close the receptacle 20 and shield the contents thereof from the elements or other potentially harmful substances. In some of these embodiments, as shown in FIG. 1A, the lid portion 50 comprises in two hinged segments 52, 54 for closing the top and side of the receptacle 20, respectively. When the lid portion 50 is in a closed position, segment 54 extends down at least to sidewall 36, thereby covering the unraised portion 30, sidewall 36, and hole 38 of the second side 26. In other embodiments, as shown in FIG. 1B-C, the double wall body 22 includes an end wall 56, and thus, the lid portion 50 is simply connected thereto and, when in a closed position, extends down to at least sidewall 36. In this way, any items that are disposed in the hole 38 and resting against the unraised portion 30 of the second side 26.

Figure 2A:
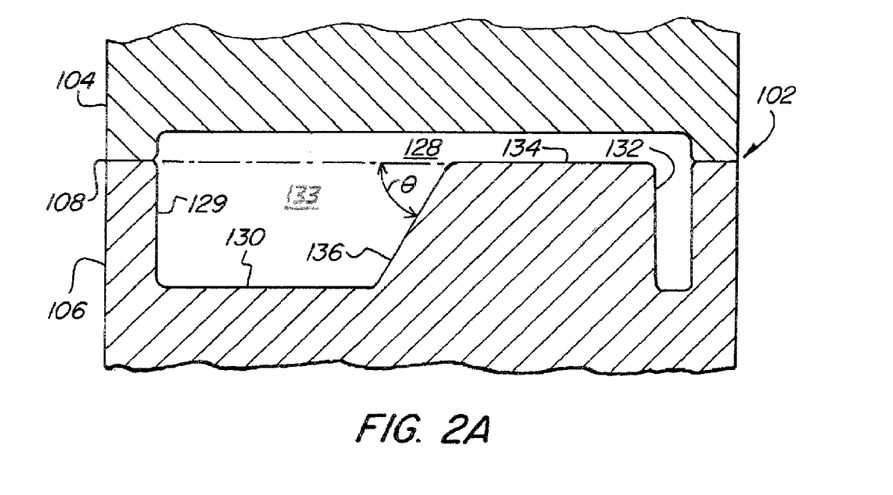
FIG. 2A is a cross-sectional view of an apparatus in accordance with the invention for making the receptacle of FIGS. 1A-D.
Figure 2B:
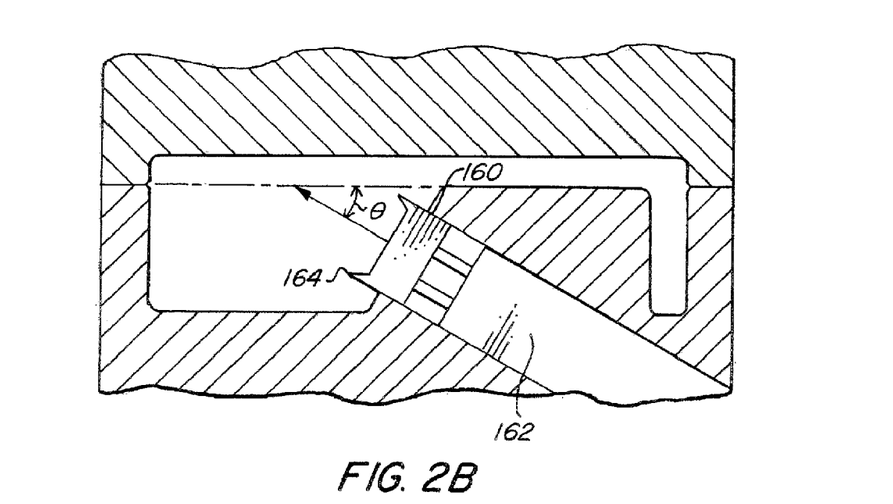
FIG. 2B is a cross-sectional view of the apparatus of FIG. 2B showing the punching mechanism.

The basic components of one embodiment of a system for creating a double wall receptacle in accordance with the invention are illustrated in FIGS. 2A-B. A mold 102 comprises a first mold portion 104 and a second mold portion 106, which, when located adjacent each other along a seam 108, at least partially enclose a cavity 128 and form a molding surface 129. The second mold portion 106 comprises a mold core having a base surface 130 and a raised portion 132 extending upwardly from the base surface 130. In some embodiments, the base surface 130 extends around the raised portion 132, thereby creating a gap 133 between the side surface 136 and the molding surface 129 around the perimeter of the raised portion 132. The raised portion 132 includes an outer surface 134 and a side surface 136. The side surface 136 is inclined at an angle (θ) of at least forty five degrees relative the outer surface 134, and, in certain advantageous embodiments, is substantially perpendicular thereto.

In operation, a parison (not shown) is placed between the mold portions 104, 106, which are then pressed adjacent each other. The cavity 128 encloses the majority of the parison, and any unnecessary portions of the parison are pinched off at the seam 108 between the two mold portions 104, 106. Fluid pressure is then introduced through an inlet (not shown), which blows the parison against the molding surface 129, thereby molding the parison into the shape of the receptacle 20, and the side surface 136 causes the formation of the inner sidewall 36 on the receptacle 20. The pressure is maintained until the molten material cools and hardens, during which time a punch 160 is employed to create the hole 38 in the sidewall 36, as is further explained below. The first and second mold portions 104, 106 are then separated, the molded receptacle 20 is removed from the mold 102, and any excess flash resulting from the parison being pinched off is cut or broken away from the container receptacle 20.

As noted above and illustrated in FIGS. 3A-C, the mold 102 includes a punch 160 for creating the hole 38 in the sidewall 36. As the walls of the molded receptacle start to cool and harden, but while they are still somewhat molten, the punch 160 is activated, at which time, a punching surface 164 of the punch 160 cuts through the sidewall 36 of the receptacle 20 enters the cavity 28. The punch is displaced by an actuator 162, which, in certain advantageous embodiments, is a fluid cylinder. The cylinder 162 displaces the punch 160 at an angle (φ) of at least forty five degrees relative to the outer surface 134 of the mold core 106, which depends, at least on part, on the angle (θ) of the side surface 136. In certain advantageous embodiments, when the side surface 136 (and consequently, the sidewall 36) are substantially perpendicular to the seam 108, the cylinder 162 displaces the punch 160 in a direction substantially parallel to the seam 108. In some embodiments, a core cap 110 is positioned over the punch to cover the space created by the stroking motion of the punch 160.

Figure 3A:
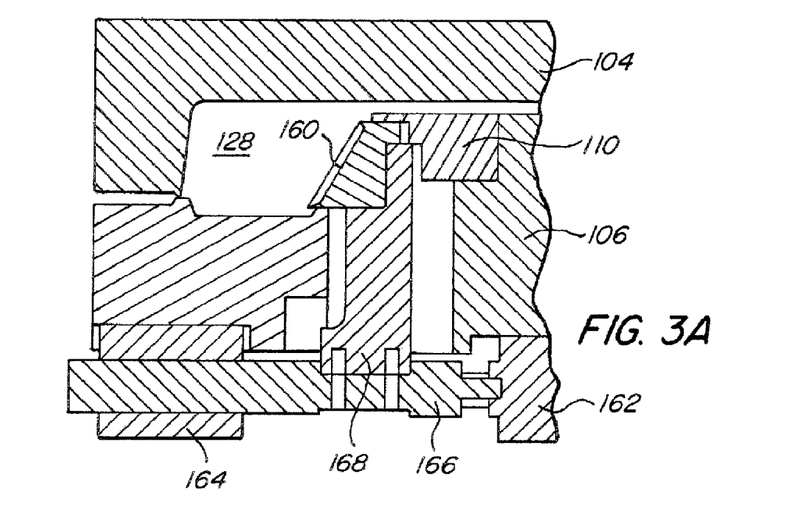
FIG. 3A is a cross-sectional view of the apparatus of FIGS. 2A-2B with a perpendicular side surface when in a first position.
Figure 3B:
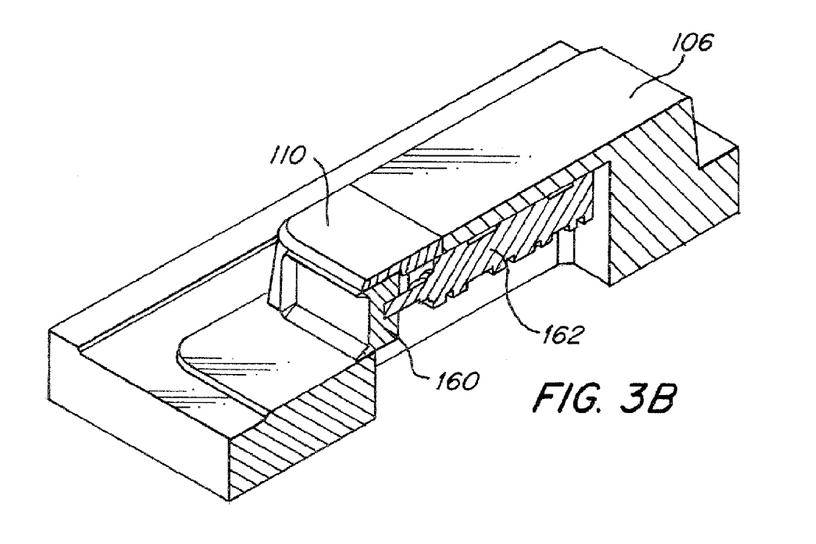
FIG. 3B is an isometric view in partial cross-section of the apparatus of FIG. 3A showing the actuator in-line with the punch.
Figure 3C:
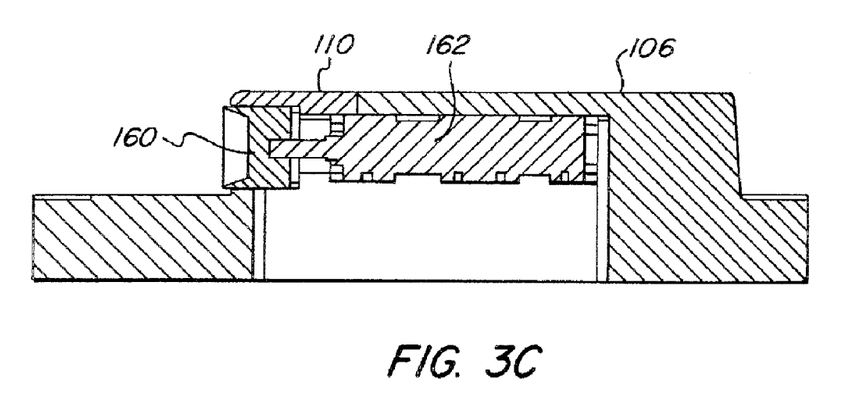
FIG. 3C is a cross-sectional view of the apparatus of FIG. 3B.

In some embodiments, as shown in FIGS. 3B-C, the cylinder 162 is located within the raised portion 134 and in-line with the punch 160. However, in other embodiments, due to space constraints, the actuating mechanism 162 is offset from the punch 160, and is mounted underneath the mold core 106. As illustrated in FIG. 3A, this is accomplished by connecting the cylinder 162 and a linear bearing 164 to the mold core 106. A shaft 166 is connected to the cylinder 162 and disposed in the bearing 164 such that actuating the cylinder 162 displaces the shaft 166 longitudinally through the bearing block 164. A mounting bar 168 is provided for mounting the punch 160 to the shaft 166, and thus, when the cylinder 168 displaces the shaft 166, the punch 160 likewise moves in a direction parallel to the shaft 166. In this way, cylinders with large diameters and longer lengths may be used to obtain the punching force necessary to overcome shrinkage of the blow molded walls about the punch 160 or otherwise necessary to punch through certain plastic resins. Similarly, because the diameter of the cylinder 162 is no longer of any concern, the position of the punch 160 is not limited, and the punch can be placed near the top of the raised portion 132. Finally, the cylinder may be further supported by a reinforced mounting surface that may not otherwise be possible if it had to be located inside the mold core 106.

Figure 4A:
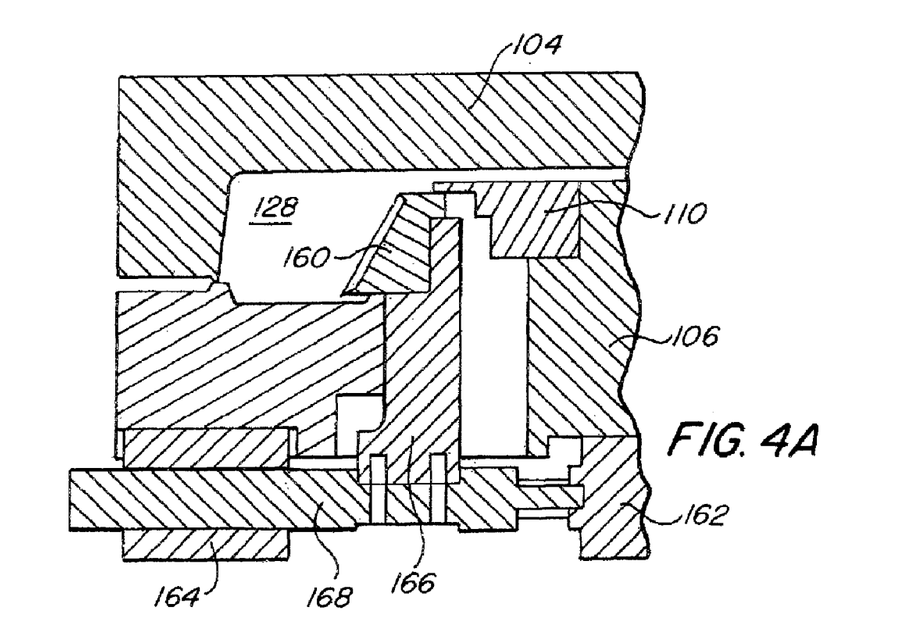
FIG. 4A is a cross-sectional view of the apparatus of FIGS. 3A-C when in a second position.
Figure 4B:
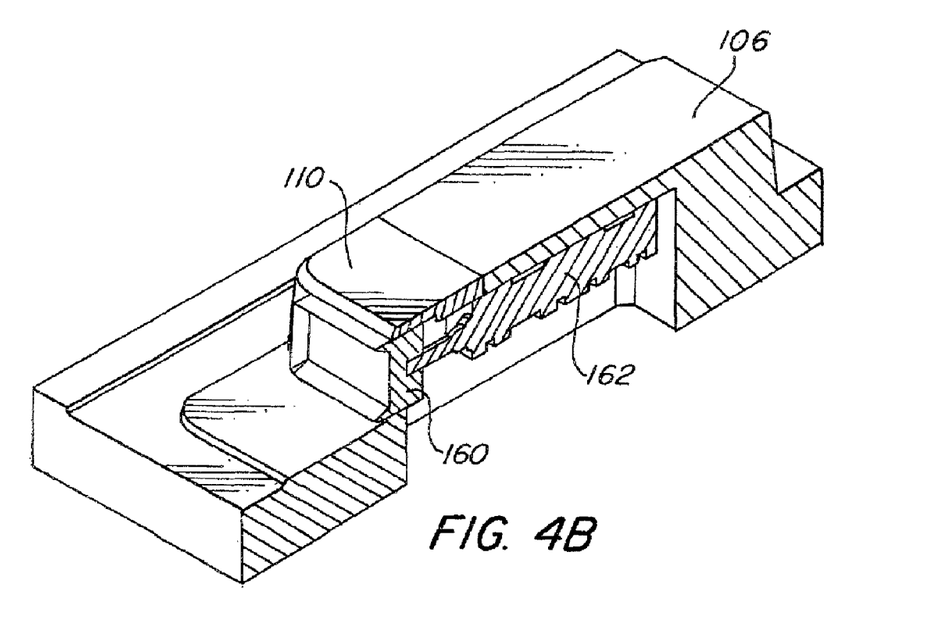
FIG. 4B is an isometric view in partial cross-section of the apparatus of FIG. 4A showing the actuator in-line with the punch.
Figure 4C:
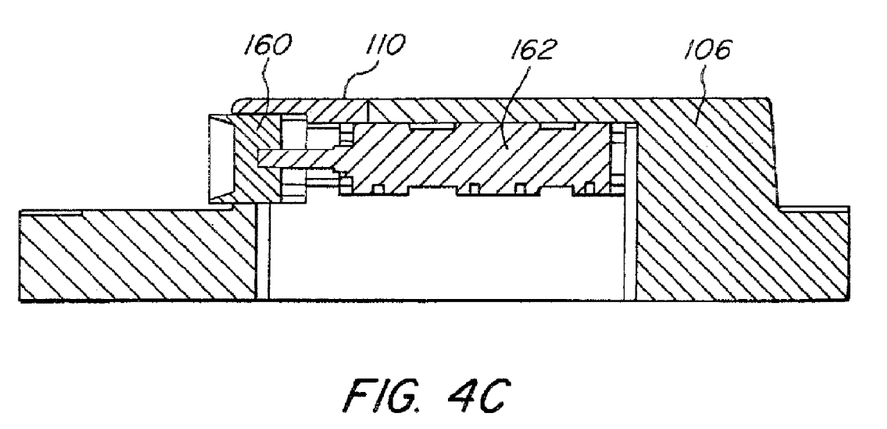
FIG. 4C is a cross-sectional view of the apparatus of FIG. 4B.
Figure 5A:
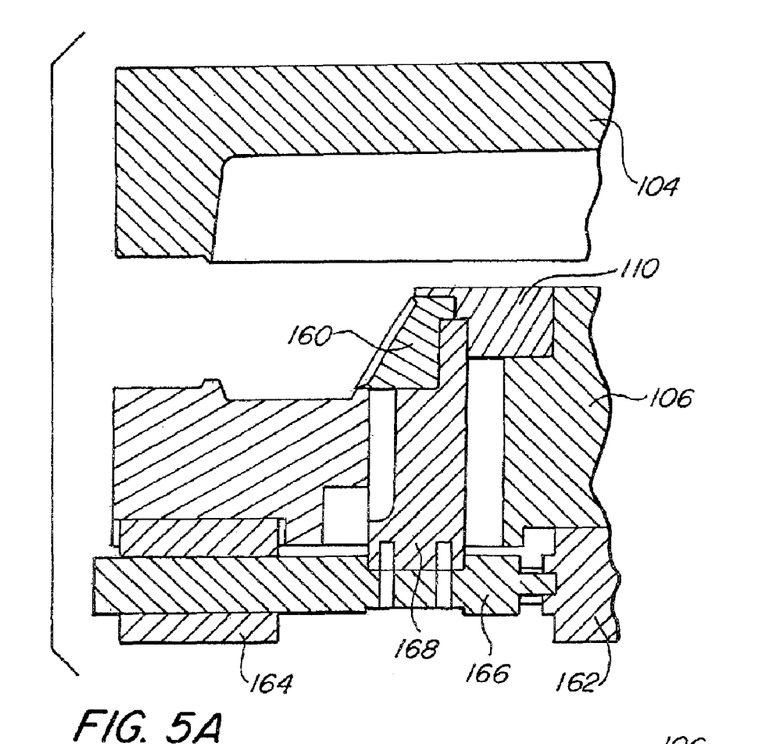
FIG. 5A is a cross-sectional view of the apparatus of FIGS. 4A-C when in a third position.
Figure 5B:
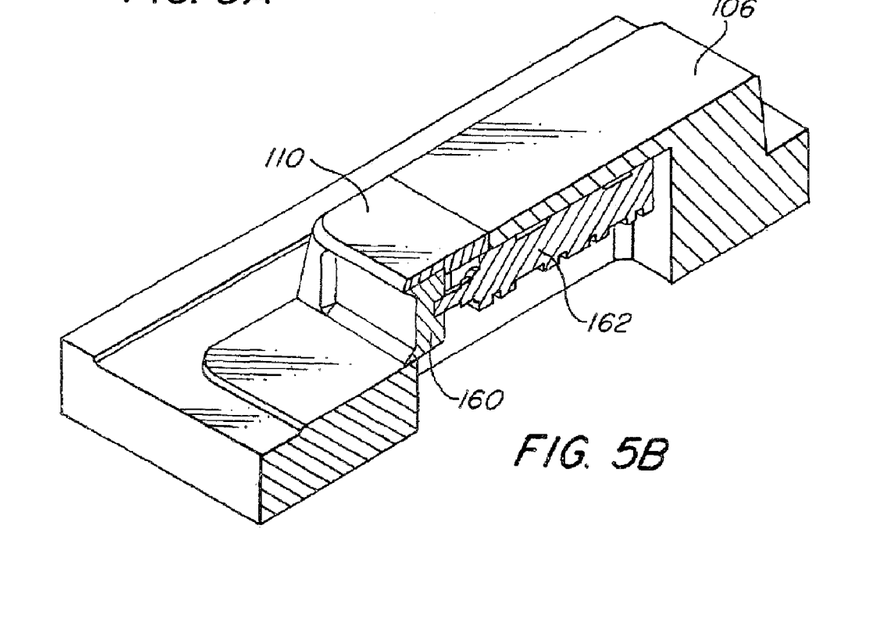
FIG. 5B is an isometric view in partial cross-section of the apparatus of FIG. 5A showing the actuator in-line with the punch.
Figure 5C:
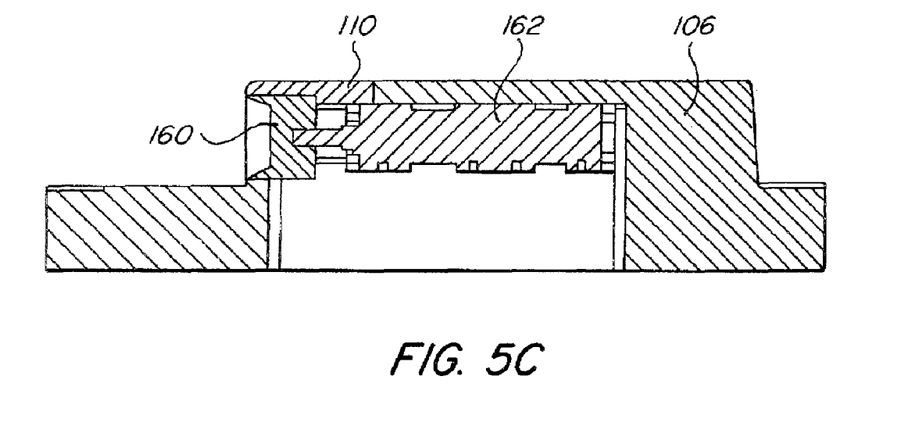
FIG. 5C is a cross-sectional view of the apparatus of FIG. 5B.

The operation of the punch is illustrated in FIGS. 3-5. In the beginning of the mold cycle, after the mold 102 is closed around the parison, the punch 160 is moved into a first position, as shown in FIGS. 3A-C. When in this position, the punch is slightly extended into the cavity 128. For example, the punch may be extended out approximately 0.2 inches past the side surface 136. Because the cutting surface 164 protrudes out into the cavity 128, the plastic material thins around the surface 164. As a result, the punch 160 will ultimately require less force in order to punch the hole 38 therethrough. Generally, the more the punch 160 is extended, the thinner that portion of the wall 36 will be, therefore requiring less punching force to create a hole therethrough. Additionally, because this extension of the punch 160 effectively creates an additional, thin wall extending into the cavity 128 perpendicular to the sidewall 36, this step can also be used to provide some addition structure around the inside of the hole 38 to act as a reinforcing rib or flange.

As the walls of the blown parison began to cool and harden against the molding surface 129, but while the plastic is still somewhat molten, the cylinder 162 is activated and rapidly moves the punch 160 to a second position, as shown in FIG. 4A-C. When in this position, the punch 160 is extended further into the cavity 128—for example, approximately 0.5 inches—and punches the hole 38 in the sidewall 36.

Subsequently, the cylinder 162 moves the punch in the opposite direction, and retracts the punch 160 back towards the raised portion 134 of the mold core 106 such that the punching surface 164 is fully retracted within the raised portion 134 and does not protrude out past the sidewall 36. As a result, when the mold 102 is opened, the receptacle 20 can be easily removed without interference from any part of the punch 160.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A blow molded receptacle, comprising:
   a double wall, blow molded body, said body having first and second sides at least partially enclosing a cavity therebetween; and
   a lid portion integrally formed with said body;
   wherein said second side includes an unraised portion and a raised portion extending transversely from said unraised portion, said raised portion having an outer wall and a sidewall perpendicular to said first side and said outer wall, such that said cavity is wider between said outer wall and said first side than between said unraised portion and said first side;
   wherein said sidewall has a hole therethrough; and
   wherein said lid portion has first and second hinged sections, and wherein, when said lid portion is moved from an open position to a closed position, said second hinged section pivots away from a common plane with said first hinged section to contact said sidewall, such that said lid portion covers said sidewall and hole when in a closed position.

2. The receptacle of claim 1, wherein said hole is a punched hole.

3. The receptacle of claim 1, wherein said raised portion extends around the perimeter of said unraised portion.

4. The receptacle of claim 1, wherein said first side has at least one aperture adapted to receive a fastener for mounting said receptacle to an object.

5. The receptacle of claim 1, wherein said second hinged section abuts said sidewall when in a closed position.

6. The receptacle of claim 1, wherein:
   said raised portion has first and second end walls transverse to said sidewall and said outer wall of said raised portion; and
   the hole in said sidewall extends from said first end wall to said second end wall.

7. A blow molded receptacle, comprising:
   a double wall, blow molded body, said body having first and second sides at least partially enclosing a cavity therebetween; and
   a lid portion integrally formed with said body;
   wherein said second side includes an unraised portion and a raised portion extending transversely from said unraised portion, said raised portion having an outer wall and a sidewall, such that said cavity is wider between said outer wall and said first side than between said unraised portion and said first side;
   wherein said sidewall has a hole therethrough; and
   wherein said lid portion has first and second hinged sections that, when moved from an open position to a closed position, fold toward the raised portion of said second side such that said second hinged section extends down to and joins with said sidewall without covering the raised portion of said second side.

8. The receptacle of claim 7, wherein said hole is a punched hole.

9. The receptacle of claim 7, wherein said raised portion extends around the perimeter of said unraised portion.

10. The receptacle of claim 7, wherein said first side has at least one aperture adapted to receive a fastener for mounting said receptacle to an object.

11. The receptacle of claim 7, wherein said second hinged section abuts said sidewall when in a closed position.

12. The receptacle of claim 7, wherein:
    said raised portion has first and second end walls transverse to said sidewall and said outer wall of said raised portion; and
    the hole in said sidewall extends from said first end wall to said second end wall.

* * * * *